May 29, 1951     W. H. WOOLF     2,554,607
PROCESS OF REMOLDING VULCANIZED RUBBER
Filed July 18, 1950     2 Sheets-Sheet 1
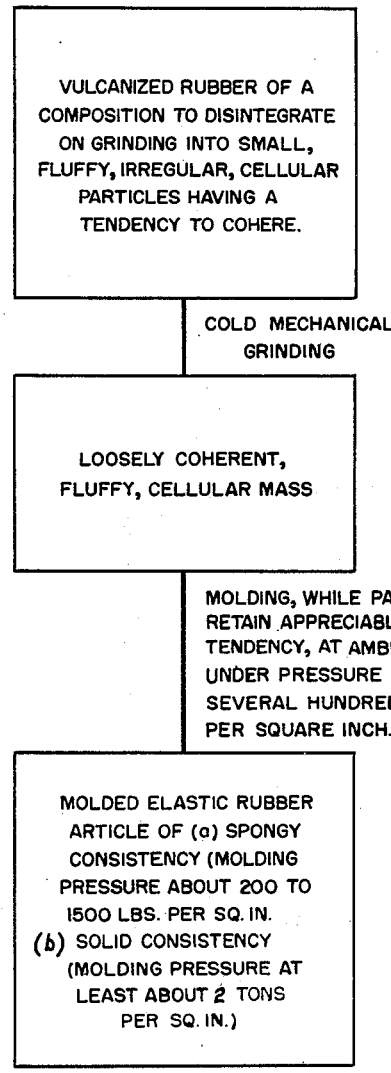
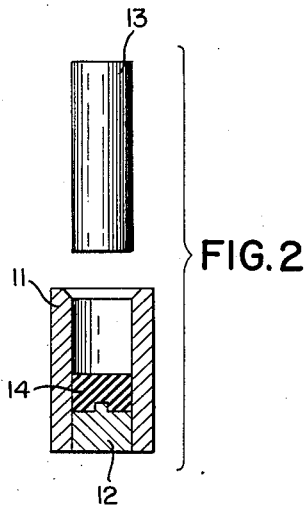
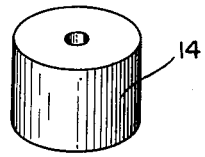
INVENTOR:
William H. Woolf
BY
Richardson, David and Nordon
ATTORNEYS May 29, 1951 W. H. WOOLF 2,554,607
PROCESS OF REMOLDING VULCANIZED RUBBER
Filed July 18, 1950 2 Sheets-Sheet 2

INVENTOR:
WILLIAM H. WOOLF
BY
Richardson, David and Verdon
ATTY'S

Patented May 29, 1951

2,554,607

UNITED STATES PATENT OFFICE 2,554,607

PROCESS OF REMOLDING VULCANIZED RUBBER

William H. Woolf, New York, N. Y.

Application July 18, 1950, Serial No. 174,383

6 Claims. (Cl. 18—55)

My invention relates to a process of remolding vulcanized rubber.

One object of my invention is to provide a simple and relatively inexpensive method of utilizing scrap rubber in the manufacture of molded elastic rubber articles.

More particularly, the principal object of my invention is to provide a process of remolding vulcanized scrap rubber into elastic rubber articles such as pads, buffers, gaskets, stoppers, washers, plugs, etc.

A specific object of the invention is to provide a process of remolding scrap rubber which does not require expensive or voluminous equipment so that the scrap can be remolded at the plant where it accrues, and shipping to a special reclaiming plant is made unnecessary with ensuing savings in time, labor and expense.

Another object of my invention is to remold vulcanized rubber by a method requiring no external heat.

Still another object of the invention is to effect the remolding of vulcanized rubber without adding any chemicals, adhesives or binders to the starting material.

A further object of my invention is to make molded elastic rubber articles from scrap rubber without any addition of new, unvulcanized, devulcanized or reclaimed rubber.

A still further object of the invention is to remold vulcanized rubber by a process requiring neither a devulcanization of the starting material before molding nor a vulcanization of the molded articles obtained.

These and other objects which will appear more clearly as the specification proceeds are accomplished according to my invention by the process set forth in detail in the following specification and defined in the appended claims.

Generally, the process according to the invention comprises the steps of selecting as starting material a vulcanized rubber of a composition to disintegrate on grinding into small, fluffy, irregular, cellular particles exhibiting, on mutual contact, a tendency to cohere, comminuting this starting material by mechanical cold grinding to produce a loosely coherent, fluffy, cellular mass, and molding said mass, while its particles retain an appreciable tendency to cohere, at room temperature to the desired shape under a pressure which may vary from a few hundred pounds to several tons and higher per square inch, depending upon the desired consistency of the molded body.

The term "vulcanized rubber" as used in the present specification and claims includes soft rubber material, and particularly scrap rubber as it accrues in the manufacture of soft rubber articles for instance by molding or stamping, and also rubber scrap consisting of or containing used waste rubber. The term "soft rubber" is intended to include natural rubber as well as vulcanizable synthetic rubber compounds.

According to one embodiment of my invention, the "vulcanized rubber" to be used as starting material in my remolding process may be substantially or prevalently pure rubber stock, that is, it may consist substantially of natural or synthetic rubber and such chemicals as have been added to the rubber for the purpose of vulcanization. Alternatively, the starting material may be loaded stock containing, in addition to rubber and vulcanizing agents, considerable proportions of other impurities such as fillers, pigments and inert additions of the type commonly used in the rubber industry, such as, for instance, carbon black, zinc oxide, etc.

I have found, however, that vulcanized material containing relatively high proportions of certain impurities and fillers will yield, on mechanical grinding, particles which lose their cohesive tendency after a relatively short period of time and, therefore, where scrap material of this type is used, remolding must be carried out within a limited period after grinding.

I have also observed that particles obtained by grinding from vulcanized rubber containing large proportions of certain fillers and other impurities, do not display an appreciable tendency to cohere, and consequently my process is inapplicable to vulcanized rubber which on grinding does not disintegrate into small, fluffy, cellular particles exhibiting a tendency to cohere.

The exact limits at which impurities may interfere with the process according to my invention, depend on the nature of the rubber and on the nature and amount of the impurities. However, the availability of any vulcanized rubber material as starting material for my process can be easily ascertained by a simple test.

I have found, in one case, that a loaded stock containing an excess of 75% impurities did not give satisfactory results, and it appears that the loaded stock should contain at least 40% of pure rubber.

The rubber may first be chopped into pieces of about 6 mm. diameter to facilitate the grinding operation. The mechanical cold friction grinding which serves to produce the small, fluffy, cellular particles having a diameter of e. g. $\frac{1}{16}$ to 1½ mm., may be carried out by means of an ordinary grindstone such as an emery or Carborundum stone, but other mechanism, such as an attrition mill, may be employed for abrading the vulcanized rubber into small, cellular, fluffy particles having a tendency to cohere.

However, if the rubber is reduced to dust in an ordinary rubber mill by chopping, shredding, slicing, cutting, shearing or tearing, the dust particles produced do not display the fluffy, irregular, cellular structure of particles obtained by grinding, nor do particles obtained by a comminuting method other than mechanical cold friction grinding show any appreciable cohesive tendency, and comminuted material consisting of such particles is not suitable for remolding at room temperature in accordance with the present invention.

The invention is illustratively exemplified in the accompanying drawings, in which:

Fig. 1 is a flow diagram of the process according to the invention;

Fig. 2 is an axial section through a mold suitable for the process according to the invention, with a plunger withdrawn from the mold and shown in elevation;

Figure 4:
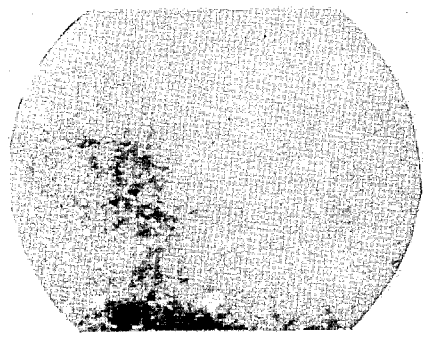
Figure 5:
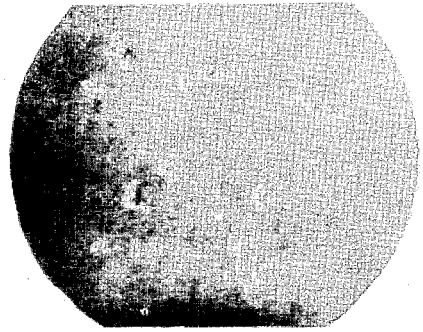
Figure 6:
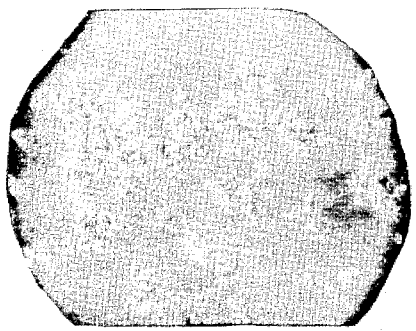
Figure 7:
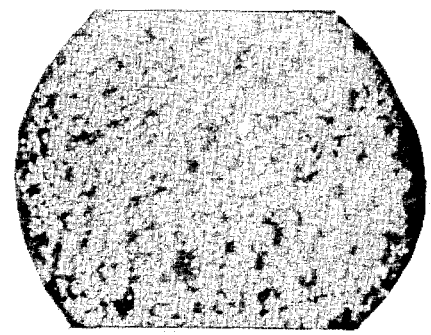
Figure 8:
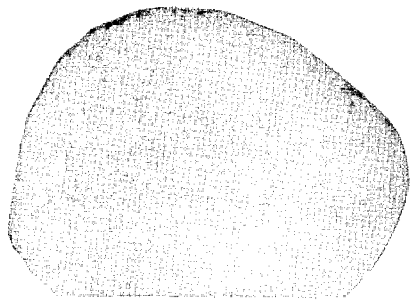

Fig. 3 is a perspective view of a molded rubber article made in the mold according to Fig. 2; and Figs. 4 to 9 are reproductions of a series of microphotographs of vulcanized scrap rubber at various stages of my process, Fig. 4 being a microphotograph of a cross-section of a piece of vulcanized scrap rubber material; Fig. 5 showing some of the individual fluffy, irregular, cellular particles obtained by mechanical cold friction grinding from the starting material according to Fig. 4; Fig. 6 showing loose agglomerations of such particles formed due to the tendency of the particles to cohere; Fig. 7 illustrating the loose, fluffy, moldable mass resulting when the agglomerations according to Fig. 6 are brought in surface contact with each other; Fig. 8 showing the surface of a spongy molded rubber body obtained from the fluffy mass according to Fig. 7 under pressure of a few hundred pounds; and Fig. 9 being a microphotograph of a cross-section through a molded solid soft rubber article obtained by subjecting a fluffy mass according to Fig. 7 to a molding pressure of about five tons per square inch.

As illustrated diagrammatically in Fig. 1, a selected vulcanized rubber is first comminuted by mechanical cold friction grinding into small fluffy, irregular, cellular particles. There particles exhibit a tendency to cohere on mutual contact. It has been found that the tendency to cohere varies in dependence upon the composition of the rubber used as starting material. If the starting material consists predominantly of pure rubber stock, the ground particles cling together even after extended storage of a week or more. If rubber containing about 50 to 55 or even 60% by weight of impurities in the form of fillers, pigments and inert materials is used as starting material, the ground particles still tend to cohere but may lose most of their cohesive tendency within about 10 minutes to about one hour after grinding. If the starting material contains more than about 75% by weight of impurities, particles ground from such material may not display any appreciable cohesive tendency even immediately after grinding.

The fluffy, loosely coherent mass of cellular particles is placed in a mold with as little handling pressure as possible and molded at room temperature while the particles still exhibit an appreciable cohesive tendency.

Molding may be effected, for instance, in a mold as shown in Fig. 2. In this figure, 11 is a cylindrical steel envelope and 12 is a cylindrical steel plug fitting slidably in the envelope 11 and having one surface shaped in accordance with the desired shape of the article to be produced. A steel plunger 13 which, in the example shown, is a simple cylindrical body, fits slidably in the envelope 11.

In carrying out the molding process, the plug 12 is inserted in the envelope 11 and a sufficient quantity of the loosely coherent, fluffy, cellular mass consisting of irregular, cellular, ground rubber particles having a cohesive tendency is placed in the envelope 11 on top of the plug 12. The material may be tamped down lightly before insertion of the plunger 13, but such tamping is not essential. The plunger 13 is then introduced into the envelope 11 on top of the material to be molded, and the mold is placed, for instance, in a hydraulic press, in which the plunger 13 may be subjected to a suitable pressure while the plug 12 rests on a solid support. The molding is done at room temperature. The mold is then removed from the press and on removal of the plunger 13 the finished molded article 14 remains in the mold 11 on top of the plug 12 as shown in Fig. 2.

The following examples may serve to further illustrate the invention:

*Example I*

A vulcanized scrap rubber material of light amber color obtained in strips of various shapes and sizes in the manufacture of surgical rubber gloves by molding and consisting of natural latex rubber stock containing not more than about 10% of vulcanizing agents, fillers, pigments or other impurities, was reduced in a chopping machine to pieces of about 6 mm. diameter. The uniformly chopped pieces were ground on an ordinary Carborundum grindstone into small fluffy, irregular, cellular particles of whitish color having a diameter of about ¼ to 1½ mm. The individual ground particles tended to agglomerate into fluffy lumps on contact with each other, and the agglomeration accumulated into a loosely coherent, fluffy, cellular mass. Within 1 hour after completion of the grinding, a quantity of this mass was placed by means of tweezers in an enclosed steel mold and subjected at room temperature to a molding pressure of about 150 to 200 pounds per square inch. The molded body obtained in this manner had a whitish color and a spongy appearance with somewhat irregular surfaces. Its elasticity was relatively high so that it was capable of withstanding considerable pressure, but its tear and shear resistance were relatively small.

*Example II*

A fluffy, cellular, loosely coherent mass obtained from the grinding of the amber colored scrap rubber material according to Example I was stored at ordinary temperature for one week after grinding. Some of the material was then placed in the same steel mold as in Example I and subjected in that mold to a pressure of about 2 tons per square inch. The resulting solid, amber colored article had approximately the same elasticity and the same resistance to tearing and shearing as the original scrap rubber material from which it was produced.

Repetition of the preceding experiment with higher pressures up to about 20 tons per square inch did not produce markedly different results.

*Example III*

A used inner tube of a black color consisting predominantly of vulcanized synthetic rubber was comminuted by mechanical cold grinding as described in Example I. The cohesive tendency of the ground particles appeared to be somewhat less than in Example I but was still noticeable. The resulting loosely coherent, fluffy, cellular mass was molded as described in Example II, and a solid, elastic rubber body was formed.

*Example IV*

A black scrap rubber material obtained as waste in the manufacture of rubber articles by stamping and consisting of about 51% by weight of natural rubber and about 49% by weight of vulcanizing agents, pigments and fillers was cross-sectioned and the cross-section was photographed through a microscope to obtain the microphotograph reproduced as Fig. 4. The material was then comminuted and ground as described in Example I.

Some of the individual, fluffy, irregular, cellular, black particles obtained by the grinding operation were photographed under a microscope. The microphotograph is reproduced as Fig. 5. The cohesive tendency of these particles was not as pronounced as that of the ground particles obtained according to Example I but, immediately after grinding, the particles tended to cohere on contact and to form agglomerations as shown by the microphotograph reproduced as Fig. 6. When these agglomerations were brought in contact with each other, they formed a loose, fluffy, cellular mass, a microphotograph of which is reproduced as Fig. 7.

A part of this mass was placed in the mold according to Fig. 2 within 10 minutes after completion of the grinding. It was then subjected to a pressure of about 500 pounds.

A spongy molded article was obtained. A microphotograph of the surface of this article is reproduced as Fig. 8. The spongy rubber body displayed some pressure elasticity but very little resistance to tearing or shearing stresses.

When the same fluffy mass as illustrated by the microphotograph according to Fig. 7 was subjected in the mold, within 15 minutes after grinding, to a pressure of about 5 tons per square inch, a solid molded, soft rubber body 14 resulted, as shown in Fig. 2 in the mold and in Fig. 3 in a separate perspective view.

Figure 9:
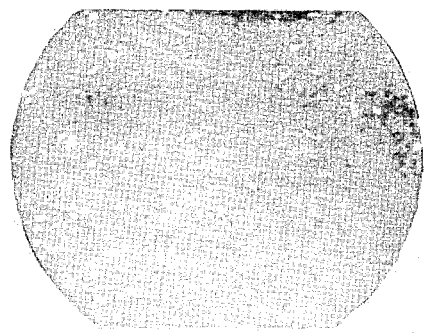

A cross-section of this molded body was photographed under the microscope, the resulting microphotograph being reproduced as Fig. 9. It will be observed that the structure of the molded body, as shown by the microphotograph, was very similar to that of the scrap rubber used as starting material. As a matter of fact, the elasticity as well as the resistance to tearing and shearing stresses displayed by the molded body were approximately the same as those of the scrap rubber material used.

It is believed that an intercellular bond was formed under cold pressure between the loose, fluffy, cohesive particles to produce the solid, molded, soft rubber article.

It was found that no such intercellular bond was formed when molding pressure was exerted on the loose fluffy mass according to Fig. 7 when the time interval between the grinding and the molding operation exceeded 1 hour. As a matter of fact, the particles appeared to lose their cohesive tendency after a relatively short time, and thereafter molding became impossible regardless of the magnitude of the pressure employed.

According to the preferred embodiments of my invention described herein, the loose, fluffy, cellular mass obtained from the cold grinding of vulcanized rubber is molded without addition of any fillers or of any new or unvulcanized rubber.

It is, however, possible to add to the ground scrap rubber a certain amount of fillers and reinforcing elements, such as textile fibers, or to incorporate a loose textile netting into the fluffy mass of ground particles just prior to molding. Other modifications will be apparent to those skilled in the art.

What I claim is:

1. A process of molding vulcanized, soft rubber material which consists of the steps of selecting as starting material a vulcanized rubber material containing at least about 40% by weight of pure rubber, comminuting this starting material by mechanical cold friction grinding into small, fluffy, irregular, cellular particles, exhibiting, on mutual contact, a tendency to cohere, thereby producing a loosely coherent, fluffy, cellular mass, molding said mass, while its particles retain an appreciable cohesive tendency, in a mold, substantially at room temperature, to the desired shape under a pressure of at least several hundred lbs. per square inch, and removing the finished article from the mold.

2. A process of molding vulcanized, soft rubber material into solid, soft rubber articles, which consists of the steps of selecting as starting material a vulcanized rubber material containing at least about 40% by weight of pure rubber, comminuting this starting material by mechanical cold friction grinding into small fluffy, irregular, cellular particles, exhibiting, on mutual contact, a tendency to cohere, thereby producing a loosely, coherent, fluffy, cellular mass, molding said mass, while its particles retain an appreciable cohesive tendency, in a mold, substantially at room temperature, to the desired shape under a pressure of the order of at least about two tons per square inch, and removing the finished article from the mold.

3. A process of molding vulcanized, soft rubber material into spongy rubber articles, which consists of the steps of selecting as starting material a vulcanized rubber material containing at least about 40% by weight of pure rubber, comminuting this starting material by mechanical cold friction grinding into small, fluffy, irregular, cellular particles, exhibiting, on mutual contact, a tendency to cohere, thereby producing a loosely coherent, fluffy, cellular mass, molding said mass, while its particles retain an appreciable cohesive tendency, in a mold, substantially at room temperature, to the desired shape under a pressure of from about 200 lbs. to about 1500 lbs. per square inch, and removing the finished article from the mold.

4. A process of molding vulcanized, soft rubber material containing about 90% by weight of rubber and not more than about 10% by weight of impurities, which consists of the steps of comminuting the vulcanized rubber material by mechanical cold friction grinding into small, fluffy, irregular, cellular particles, exhibiting, on mutual contact, a tendency to cohere, molding the resulting loosely coherent, fluffy, cellular mass, while its particles retain an appreciable cohesive tendency, in a mold, substantially at room temperature, to the desired shape under a pressure of at least several hundred lbs. per square inch, and removing the finished article from the mold.

5. A process of molding vulcanized, soft rubber material containing about 50% by weight of rubber and 50% by weight of impurities in the form of fillers, pigments, and vulcanizing agents, which consists of the steps of communiting the vulcanized rubber material by mechanical cold friction grinding into small, fluffy, irregular, cellular particles, exhibiting, on mutual contact, a tendency to cohere, molding the resulting loosely coherent, fluffy, cellular mass within about five to fifteen minutes after completion of the grinding operation, in a mold, substantially at room temperature, to the desired shape, under a pressure of at least several hundred lbs. per square inch, and removing the finished article from the mold.

6. A process of molding vulcanized, soft rubber material which consists of the steps of selecting as starting material a vulcanized rubber material containing at least about 40% by weight of pure rubber, comminuting this starting material by mechanical cold friction grinding into small, fluffy, irregular, cellular particles, exhibiting, on mutual contact, a tendency to cohere, thereby producing a loosely coherent, fluffy cellular mass, molding said mass, while its particles retain an appreciable cohesive tendency, in a closed mold, substantially at room temperature, to the desired shape under a pressure of at least several hundred lbs. per square inch, and removing the finished article from the mold.

WILLIAM H. WOOLF.

REFERENCES CITED

The following references are of record in the file of this patent:

UNITED STATES PATENTS

| Number | Name | Date |
|---|---|---|
| 12,212 | Morey | Jan. 9, 1855 |
| 967,751 | Gare | Aug. 16, 1910 |
| 992,425 | Hyatt | May 16, 1911 |